Patented Dec. 15, 1953

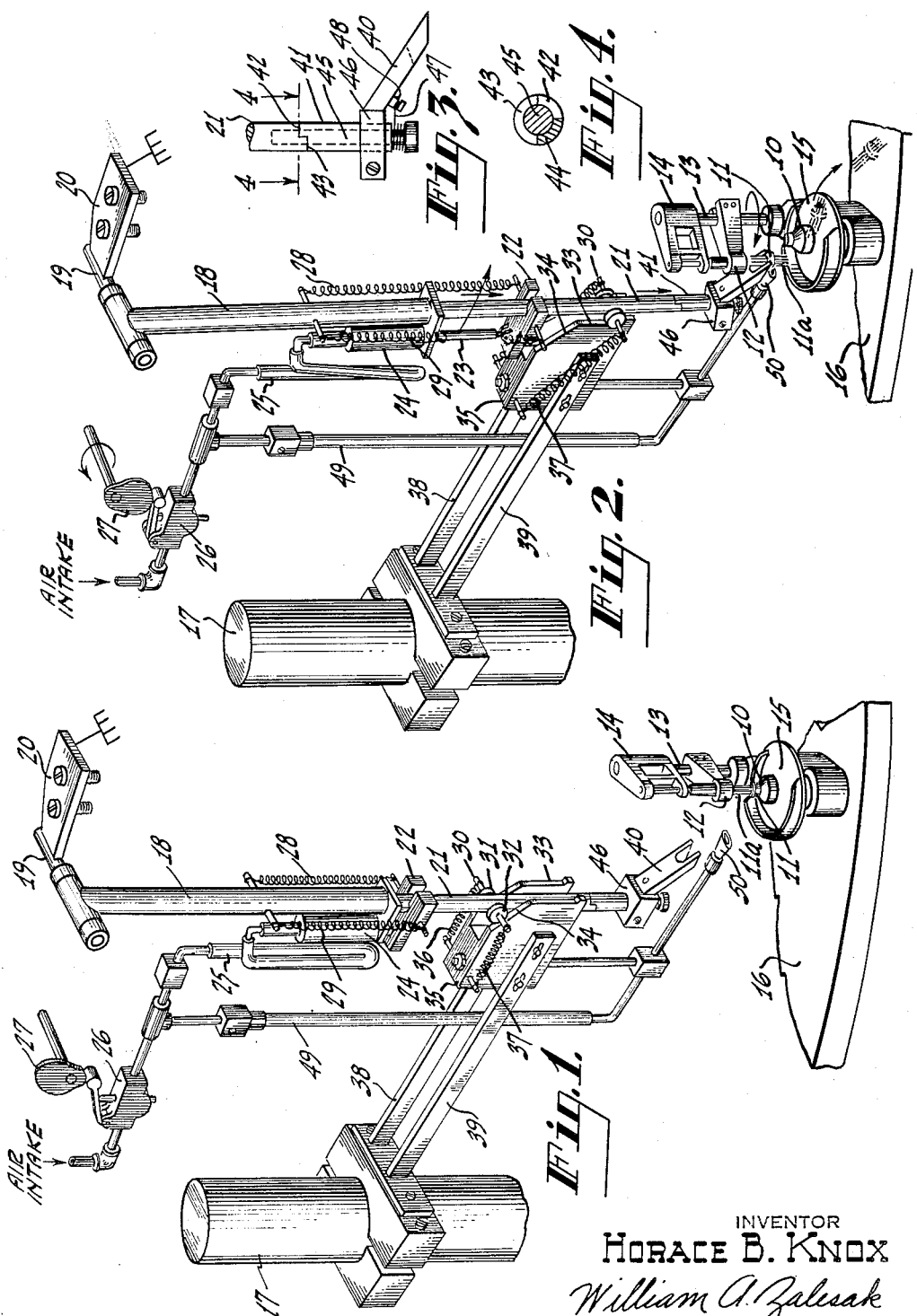

2,662,344

UNITED STATES PATENT OFFICE 2,662,344

EJECTING MECHANISM FOR GLASS FORMING APPARATUS

Horace B. Knox, Belleville, N. J., assignor to Radio Corporation of America, a corporation of Delaware Application March 24, 1950, Serial No. 151,623

6 Claims. (Cl. 49—1)

The present invention relates to a glass forming apparatus utilizing molds having apertures therein for forming softened glass with one or more wires extending therethrough to predetermined shape. More particularly the invention concerns a mechanism for ejecting processed glass forms from one of the molds when the wires referred to are stuck in the apertures therein.

One type of glass forming apparatus is a machine for making flat or button type stems which form the lower end walls of electron tube envelopes through which lead-in conductors extend. Stem making machines of this type include pairs of molds vertically arranged. In each pair the lower mold is adapted to receive and support on a horizontal surface thereof an unformed glass body such as a relatively short section of glass tubing. The lower mold includes a plurality of apertures in said surface thereof disposed in a predetermined array which may be circular for receiving a plurality of wires adapted to serve as the lead-ins in the finished stem. The upper mold has a lower surface disposed in a plane parallel to the plane of the horizontal surface of the lower mold and movable vertically with respect thereto. The upper mold also has apertures therein registering with the apertures in the lower mold for receiving upper portions of the wires referred to. After application of heat the molds are brought together to form the stem.

After the stem is formed, the upper mold is raised and caused to move out of registry with the lower mold to facilitate removal of the finished stem from the apparatus, as by an air jet. However, sometimes the removal does not occur at all or as quickly as desired, in view of faults in the stem assembly or faulty operation of the apparatus.

While means are usually provided on stem making machines of the type discussed for engaging the lower ends of the lead-ins and pushing the wires upwardly out of the apertures in the lower mold to completely remove the stem assembly from the lower mold, the ejection of the stem assembly from the upper mold is only partly accomplished. Consequently if the upper end portions of the lead-in wires should be bent or otherwise deformed, this partial ejection of the stem assembly from the upper mold may not always result in a full release of the assembly by said mold. This interferes with the automatic operation of the apparatus since it requires the services of an operator to remove the assembly stuck in or adhering to the upper mold.

It has not been deemed desirable heretofore to provide a mechanism for automatically and consistently ejecting finished stems from the upper mold of a stem making apparatus in view of the already crowded conditions on such apparatus. Such crowded conditions involve the danger of interference between moving parts of the apparatus and parts of an ejecting mechanism which might result in damage to the mechanism or to the stem making apparatus.

Accordingly an object of the invention is to improve the automatic characteristics of a glass forming apparatus.

A further object is to provide a glass forming apparatus capable of automatically and consistently ejecting a finished glass form therefrom.

Another object is to provide an ejecting means for an electron tube stem making machine for fully releasing and ejecting therefrom a stem assembly having lead-in wires stuck in or adhering to apertures in a mold of said machine.

A further object is to provide an ejecting system for a stem making apparatus whereby the stem is subjected to a series of increasing forces for accomplishing its removal from the apparatus.

Another object is to provide an ejecting mechanism for a crowded stem making apparatus without impairing the apparatus.

A further object is to provide an ejecting mechanism for a stem making apparatus having a cushioned mounting for avoiding breakage thereof or of parts of the apparatus.

One ejecting means incorporating the invention may take the form of a mechanism including a forked member or finger adapted to engage edge portions of the upper surface of a stem partly removed from the upper mold of a stem making apparatus but stuck thereto by lead-ins extending through the stem. By limiting engagement of the fork to edge portions of the stem the danger of disturbing the lead-ins extending through the stem is avoided. The forked member is supported in a cushioned manner on a structure having vertical and horizontal components of motion. The cushioned support permits the member to travel in the direction of a force applied thereto to prevent breakage of the member and parts of the apparatus with which it is associated. The vertical and horizontal movements of the member permit the member to be normally spaced sufficiently from the mold to prevent interference therewith during intermittent movement of the mold on the turret of the apparatus.

The support structure for the forked member comprises an assembly including a shaft and a tubular member into which the shaft is adapted to telescope to provide a vertical component of motion to the shaft. One end of the tubular member is mounted on a horizontal pivot for providing a horizontal component of motion to the shaft. The assembly also includes a block having adjacent vertical and inclined edges and means for causing the movements of the shaft referred to to follow these edges. The block referred to is supported in predetermined space relation to the molds of the apparatus for critically controlling the motions of the shaft with respect to the molds. The forked member referred to is mounted on the lower end of the shaft and is resiliently restrained against rotation on the axis of the shaft.

Suitable means such as a pneumatic system and springs may be employed for actuating the assembly in predetermined time relation to the cycles of operation of the stem making apparatus and provides further cushioned support for the ejecting mechanism.

While the invention is pointed out with particularity in the appended claims it may best be understood from a consideration of the following detailed description of an embodiment thereof taken in connection with the appended drawing in which:

Figure 1 is a perspective view of the ejecting mechanism of the invention in non-ejecting position in relation to a portion of a stem making apparatus;

Figure 2 is a view similar to that of Figure 1 except that the mechanism is shown in position for ejecting a completed stem from the apparatus;

Figure 3 is a side view of a portion of the ejecting mechanism and shows the cushioned mounting of the forked member of the mechanism; and Figure 4 is a cross section along the line 4—4 of Figure 3 and shows a further aspect of the cushioned mounting of the forked member.

Referring to the drawing in more detail, the ejecting mechanism of the invention is adapted to function in association with a stem making apparatus.

Associated apparatus

The associated apparatus with which the ejecting mechanism may be employed is a stem making machine, including a turret having a plurality of heads thereon, one of which is shown in Figures 1 and 2 adapted to travel through a plurality of stations including an unloading station. The head referred to includes a lower mold 10 having an upper surface lying in a horizontal plane for receiving a stem 11 and having apertures therein for receiving lead-in wires 11a extending through said stem. Means, not shown, are provided for pushing lead-ins 11a completely out of the apertures in the lower mold for fully releasing a finished stem assembly therefrom. The head also includes an upper mold 12 having a lower surface lying in a horizontal plane and provided with apertures for receiving the upper portions of lead-ins 11a. The upper mold is supported on a shaft 13 for rotation in a horizontal plane. Shaft 13 is also movable vertically in response to the cycle control, not shown, of the apparatus for raising the upper mold from the lower mold. Shaft 13 also supports a member 14 having appreciable weight for partially ejecting the lead-ins 11a from the apertures in the upper mold 12 when said upper mold is raised from the lower mold. The head also includes a tray 15 for receiving finished stems ejected from the molds. The turret 16 of the apparatus rotates around a fixed shaft 17.

While the ejecting means provided for the lower mold 10 is operable to automatically and consistently eject a finished stem assembly from said mold, it sometimes happens that the ejecting means including the member 14 does not completely accomplish a release of the stem assembly from the upper mold 12. This failure of full release may be due to bends or other deformations in the upper portions of the lead-ins 11a resulting in a sticking of such portions to, or relatively strong frictional engagement thereof with, the walls of the apertures in the upper mold. This engagement may be sufficiently strong to withstand the relatively weak force applied to the stem assembly by the air jet from nozzle 50, to be more completely described in the following. According to the invention therefore there is provided a positive acting and automatically operable ejecting mechanism for mechanically engaging a stem stuck in or adhering to the upper mold 12 and failing of release in response to the air jet referred to.

The ejecting mechanism

The ejecting mechanism is fixed to shaft 17 adjacent the unloading station of the stem making apparatus for removing from the upper mold 12 a finished stem stuck thereto. The ejecting mechanism includes a tubular member 18 pivoted at its upper end on shaft 19 fixed to a stationary support, not shown of the apparatus by means of a bracket 20. Telescoping into tubular member 18 is a shaft or rod 21 fixed to a block 22. Block 22 is fixed to one end of piston 23 shown in Figure 2 of a pneumatic system including cylinder 24, conduit 25, valve 26 and valve actuating means such as cam 27. The pneumatic system is connected to a suitable air pressure source, not shown. It will be noted that piston 23 is adapted to impart a downward motion to shaft 21. To move the shaft upwardly there are provided two springs 28, 29 fixed to the tubular member 18 and to the block 22. The springs referred to are appreciably tensioned when block 22 moves downwardly in response to the thrust of piston 23. When the downward thrust of piston 23 is completed, air valve 26 is closed resulting in release of pressure on piston 23 in a manner to be described. This termination of opposition of the piston 23 to the tension of springs 28, 29 results in an upward movement of shaft 21.

Fixed to shaft 21 is a pin 30 having wheels 31, 32 which are adapted to ride on adjacent cams or edge portions 33, 34 of a block 35. Wheels 31, 32 are caused to follow these adjacent cam or edge portions during upward and downward movements of shaft 21 by means of springs 36, 37 fixed to block 35 and pin 30 and urging the wheels against the edge portions referred to. Edge portion 34 is inclined so that a downward travel of shaft 21 results in downward and lateral components of motion of the shaft. The edge portion 33 guides shaft 21 in a downward movement having only a vertical component. The block 35 is fixed to shaft 17 by a bracket having arms 38, 39.

At the lower end of shaft 21 is mounted a forked member or finger 40. When the shaft 21 moves downwardly in a path controlled by edges 33, 34 of block 35 it first causes the forked member to travel toward the partly removed stem 11 on the upper mold 12 shown in Figure 2 to engage upper edged portions of the stem and with the lead-in array disposed within the space defined by the fork. The forked member is then caused to travel downwardly to completely release the stem from the upper mold. The released stem then falls to the tray 15 and from there to a suitable receptacle, not shown.

The forked member or finger 40 is mounted in a cushioned manner at the lower end of shaft 21. As shown in Figures 3 and 4 the lower portion of shaft 21 includes a sleeve 41 having a raised end portion 42 and a lowered end portion 43 constituting a stepped end. The end of shaft 21 is also stepped and has a lowered end portion 44 adapted to engage the lowered end portion 43 of sleeve 41. The end portions 42 on the sleeve and 44 on the shaft each have an arcuate extent of 90°, while the other end portions of the sleeve and shaft each have an arcuate extent of 270°. The portion 44 of the shaft is in abutment with the portion 43 of the tubular structure and serves as a stop to limit the relative angular movement of the shaft and tubular structure aforementioned. Angular movements of the tubular structure 41 in relation to shaft 21 will cause the portion 42 of said structure to abut against the portion or stop 44 of the shaft at the ends of such movements. Sleeve 41 is mounted on the end of shaft 21 by means of a bolt 45 screwed into shaft 21. This permits the sleeve 41 to rotate on the bolt 45 with the lowered end portion 44 of shaft 21 engaging the lowered end portion 43 of the sleeve 41. The maximum magnitude of rotation is therefore through an arc of 180 degrees. Fixed to sleeve 41 is a block 46 to which the forked member 40 in turn is fixed. The sleeve 41 and the forked member referred to may be biased by spring 47 engaging lug 48 on the forked member, to assume any predetermined angular position required for engagement of the forked member with the stem 11a during operation of the mechanism. This results in a resilient mounting of forked member 40 and renders it responsive in free movement to a force applied thereto laterally by other parts of the apparatus. The resilient mounting is further enhanced by a pneumatic power source referred to and by the pivotal mounting of tubular member 18, for absorbing impacts from other than lateral directions. The ejecting mechanism of the invention is therefore well suited for use on crowded structures where interference with other parts is likely.

Also associated with the pneumatic system previously referred to is a conduit 49 terminating in a nozzle 50. The conduit 49 is connected in parallel with respect to the conduit 25 serving the cylinder 24. Thus when air valve 26 is closed at the end of a downward thrust of piston 23 the air pressure in cylinder 24 is released immediately through conduit 49 and nozzle 50 to release opposition to the tensioned springs 28, 29 whereby the forked member or finger 40 is caused to rise. The air nozzle 50 is disposed to be adjacent a stem stuck to the upper mold 12, when the mold is swung out of registry with the lower mold as shown in Figure 2. When a stem is relatively loosely stuck to the upper mold the air blast from the nozzle may be sufficient to eject it. However, when a stem is more firmly stuck to the upper mold and not responsive to the air jet from the nozzle, the forked member 40 will release it and the air jet in this instance will serve to direct the stem to a portion of the tray 15 from which it readily falls into a chute or receptacle not shown.

*Operation of ejecting mechanism*

At the unloading station of a stem making apparatus the upper mold 12 of a head thereof is raised and carries with it the stem 10 as a consequence of friction between the apertures in the mold and the upper portions of the lead-ins extending through the stem. The cycle control, not shown, of the apparatus then causes the upper mold to swing in a clockwise direction as shown in Figure 2 and causes cam 27 to rotate to open the air valve 26 also shown in Figure 2. Opening of air valve 26 results in an immediate air blast from nozzle 50 on the stem 11 which may be sufficient to dislodge it from its engagement with the upper mold. Immediately thereafter and after an air pressure has been built up in cylinder 24, shaft 21 and forked member 40 are caused to move downwardly by piston 23 and laterally by engagement of wheels 31, 32 with inclined edge 34 to a position disposing the forked member in engagement with the upper surface of a partly ejected stem in the upper mold that may have failed of complete dislodgment in response to the air blast referred to. After the engagement referred to is completed, the shaft 21 and forked member 40 are caused to move downwardly, this motion being guided by engagement of wheels 31, 32 with the vertical edge 33, resulting in a pulling of the lead-ins of a stuck stem from the apertures in the upper mold and release of the stem from the mold. On such release the air blast from nozzle 50 will direct the falling stem to a suitable receptacle, not shown.

After the forked member 40 has completed its downward travel, the cycle control of the stem making apparatus will again actuate cam 27 to close valve 26. This will remove opposition to the tensioned springs 28, 29 resulting in an upward movement of the shaft 21 and forked member 40 into a position providing clearance between the ejecting mechanism and moving parts of the stem making apparatus during the succeeding motion portion of its cycle of operation. In the event that synchronism between the operation of the ejecting mechanism and the apparatus with which the mechanism is used should be impaired, so that the forked member 40 extends into the path of travel of a succeeding head of the apparatus, engagement between the forked member and the head will merely result in a deflection of the member in a pivotal movement on bolt 45.

If the cycle control of the stem making apparatus is in the form of a continuously movable member such as a well known Geneva gear, cam 27 may be connected thereto in a manner to make one complete revolution during a cycle of intermittent movement of turret 16. Thus during the motion portion of such cycle the narrower portion of cam 27 may be arranged to face valve 26 to keep it closed, while during the succeeding stationary portion of said cycle, the wider portion of the cam may be caused to open valve 26 to actuate the ejecting mechanism of the invention.

It will be noted from the foregoing that I have provided an advantageous ejecting mechanism for glass forming apparatus whereby the characteristic of automatic operation thereof is improved. Furthermore, the ejecting mechanism of the invention is advantageous in association with apparatus having crowded space conditions in that it avoids the danger of breakage of parts due to interference between the mechanism and other parts of the apparatus. The ejecting mechanism is particularly useful as a part of a stem making apparatus wherein a sticking of the stem to a mold of the apparatus involves a sacrifice of automatic operation. A stem making apparatus including the ejecting mechanism of the invention is therefore capable of increased output with reduced labor cost and with consequent increase in economy in fabricating stems for electron tubes.

While the invention has been described by reference to one embodiment thereof, it will be obvious to persons skilled in the art that the invention may assume other embodiments without departing from the spirit of the invention, and it is therefore intended that such other embodiments be included within the scope of the appended claims.

I claim:

1. In a glass forming apparatus having a mold for forming a glass body to predetermined shape and movable in a predetermined path the improvement comprising, an ejecting mechanism adjacent said path, said mechanism comprising an elongated support, said support including a tubular member and a shaft telescoping into said tubular member from one end thereof, said tubular member being pivotally mounted at the other end thereof, a finger extending from the free end of said shaft, means for moving said shaft longitudinally with respect to said tubular member, and means for deflecting said support to dispose said finger in said path for ejecting said glass body from said mold.

2. In a glass forming apparatus having a mold for forming a glass body to predetermined shape and movable in a predetermined path, the improvement comprising an ejecting mechanism comprising an elongated support mounted at one end thereof for arcuate movement, said support including a portion movable longitudinally of said support and having a free end, a finger mounted at said free end of said portion, a pin extending transversely of said support, a fixed block having adjacent angularly disposed edges adjacent said path, means for longitudinally moving said portion, and means for urging said pin toward said edges whereby said edges are engaged by said pin when said portion is moved longitudinally and said finger is extended into said path for ejecting said glass body from said mold.

3. An ejecting apparatus for ejecting a flat glass body from a processing apparatus in which it is stuck, comprising in combination a nozzle for directing an air blast to said body with a predetermined force, a mechanical ejector for engaging said body and applying thereto a releasing force greater than said predetermined force and pneumatic means for providing said air blast and for actuating said ejector, said pneumatic means including a cylinder having a piston in engagement with said ejector, and a valve having an inlet and an outlet, said inlet being connected to a source of air under pressure, said outlet being connected to said cylinder and said nozzle, whereby on opening said valve, said air blast is immediately provided and said ejector is actuated shortly thereafter on pressure build-up in said cylinder.

4. In a glass forming apparatus having a mold for forming a glass body to predetermined shape and movable in a predetermined path, the improvement comprising an ejecting mechanism adjacent said path, said mechanism including a support having two elongated members in telescoped engagement, the free end of one of said members being pivotally mounted to permit arcuate movement of said support, a finger mounted at the free end of the other of said members, a pin extending from opposite sides of said other of said members, a block having edges engaging end portions of said pin during longitudinal movements of said other of said members, said edges extending toward said path, and means for moving said other of said members longitudinally, whereby said finger is urged into said path for ejecting said glass body from said mold.

5. In a glass forming apparatus having a mold for forming a glass body to predetermined shape and movable in a predetermined path, the improvement comprising an ejecting system for ejecting the formed glass body from said mold, said system including a nozzle adjacent said path for directing an air stream of relatively small force against said formed glass body, and a mechanical ejector adjacent said path and movable to engage said formed glass body with relatively large force and including a pneumatic actuating means, a conduit connected to a source of air under pressure, and to said nozzle and pneumatic actuating means, and a valve across said conduit between said air source and said nozzle and actuating means, said pneumatic actuating means including a cylinder connected to said conduit for air pressure build-up therein on opening said valve, said mechanical ejector including a movable finger and power transfer means between said finger and cylinder for translating a relatively high air pressure in said cylinder into movement of said finger into said path, whereby movement of said finger is appreciably delayed after opening said valve, said nozzle being responsive to form said air stream immediately on opening said valve, whereby said glass body is first subjected to said air stream and then to said movable finger for reducing shock effects of said system on said glass body.

6. In a glass forming apparatus having a mold for forming a glass body to desired shape and movable in one direction in a predetermined path, the improvement comprising an ejecting mechanism adjacent said path and including a finger, a support for said finger, said support including a plurality of members, one of said members comprising a tubular structure having a stepped end including a stop, said finger being fixed to the other end of said tubular structure, and another of said members comprising a shaft having a stepped end in abutment with the stepped end of said tubular structure and including a stop, each of said stepped ends including a portion having an arcuate extent of 90° and another portion having an arcuate extent of 270°, said first named portion being spaced axially of each of said tubular structure and shaft from said second named portion towards said end of each of said structure and shaft, said first-named portion of said shaft comprising said stop and being in abutment with said second named portion of said tubular structure, whereby said tubular structure is angularly movable about said shaft through an arc of 180°, means fixed to said tubular structure and engaging said shaft for preventing relative longitudinal movement therebetween, a spring fixed to said means and bearing against said finger for urging said finger against said one direction for causing said stops to abut, and means for moving said support to dispose said finger in said path while so urged, whereby said finger is adapted to move in an angular deflection in said one direction and against the force of said spring in response to a thrust thereon by said apparatus and for preserving said ejecting mechanism from damage by said thrust.

HORACE B. KNOX.

References Cited in the file of this patent

UNITED STATES PATENTS

| Number | Name | Date |
|---|---|---|
| 796,470 | Swan | Aug. 8, 1905 |
| 972,203 | Malton | Oct. 11, 1910 |
| 1,136,275 | Roehrich | Apr. 20, 1915 |
| 1,911,742 | Berry | May 30, 1933 |
| 2,192,302 | Errett | Mar. 5, 1940 |
| 2,317,839 | Westin | Apr. 27, 1943 |
| 2,324,385 | Gustin et al. | July 13, 1943 |
| 2,367,515 | Moon | Jan. 16, 1945 |

FOREIGN PATENTS

| Number | Country | Date |
|---|---|---|
| 484,315 | France | June 29, 1917 |